United States Patent [19]

Kaak

[11] Patent Number: 5,131,526
[45] Date of Patent: Jul. 21, 1992

[54] CONVEYOR FOR A TREATMENT UNIT

[76] Inventor: Stephanus W. Kaak, Varsseveldseweg 20A, 7061 GA Terborg, Netherlands

[21] Appl. No.: 610,857
[22] Filed: Nov. 7, 1990
[51] Int. Cl.$^5$ .............................................. B65G 21/18
[52] U.S. Cl. ...................................... 198/778; 198/852
[58] Field of Search ............... 198/778, 831, 851, 852, 198/853

[56] References Cited

U.S. PATENT DOCUMENTS

| | | | |
|---|---|---|---|
| 3,666,083 | 5/1972 | Smith | 198/778 |
| 4,184,588 | 1/1980 | Lapeyre | 198/778 |
| 4,222,483 | 9/1980 | Wootton et al. | 198/831 |
| 4,448,301 | 5/1984 | Alger | 198/778 |
| 4,865,183 | 9/1989 | Hodlewsky et al. | 198/853 X |
| 4,953,693 | 9/1990 | Draebel | 198/853 |
| 4,972,942 | 11/1990 | Faulkner | 198/853 |
| 5,031,757 | 7/1991 | Draebel et al. | 198/852 |

Primary Examiner—Joseph E. Valenza
Attorney, Agent, or Firm—Zarley, McKee, Thomte, Voorhees, & Sease

[57] ABSTRACT

The injection-moulded links of an endless conveyor belt (4), especially designed for moving products through a treatment unit, comprise a number of flat link portions (8) with recesses (10) defined by pulling arms (9), said link portions (8) having slits (12) and said recesses (10) being adapted to receive link portions of an adjacent link so that a pivoting pin (7) passing through the pulling arms and the slits can connect both link portions. Preferably at least one semi-circular end wall of the slits of the uttermost link portions is at an angle that corresponds to the curvature radius of the drums of the conveyor wherein the conveyor belt is to be mounted.

7 Claims, 3 Drawing Sheets

CONVEYOR FOR A TREATMENT UNIT

The invention relates to a conveyor, comprising an endless conveyor belt provided with pivoting pins, for moving products along a path through a treatment unit, said unit substantially comprising at least two drums or similar guiding means being rotatable about a vertical centre line, along which said path follows a curve of a definite grade value in a slightly tilted plane, and support members for the remaining, also slightly tilted, track portions, the arrangement being so that the products to be treated can be supplied at the one drum in a low position and discharged at the other drum in a high position or vice versa, said conveyor belt returning from the high position to the low position via a vertical and a horizontal path portion, and driving and tensioning means for the conveyor belt.

Known units of the type as referred to above, which are i.a. known as cooling towers for bakery products, employ metal strip conveyor belts which are mounted on conveyor chains. Apart from the additional expenses on account of the manufacture, assembly and maintenance of these chains, they also produce a lot of noise and they are difficult to clean, which is a considerable drawback. During operation of the conveyor small metal particles will be released, as is the case in other units or machinery involving metal parts which move with respect to one another, which particles are deposited on the metal strips and pivoting pins together with crumbs and fat particles originating from the conveyed products.

The inventions aims to improve this situation. According to the invention this has been attained in that a link of the conveyor belt consisting of a material that can either be rolled or injection-moulded, comprises a number of flat link portions with recesses defined by pulling arms, in that the pivoting pins are tightly secured to the pulling arms and are able to move in the plane of the conveyor belt through slits of the link portions disposed in the recesses, and in that a driving means comprises at least one drive wheel resembling a sprocket wheel with teeth which are received in the space between two link portions.

It is preferred to manufacture the links by the known method of injection moulding of a suitable synthetic material.

The adjacent pulling arms of two neighbouring link portions may be connected by a sleeve which can receive a pivoting pin, and at least one end of each pivoting pin is secured in an exterior sleeve connected to an outer pulling arm. This manner of arranging the link shaft provides sufficient space for the operation of a drive wheel, and apart from that the pivoting pin cannot release itself under the influence of vibration.

The measures to be discussed hereinafter are particularly relevant to the curved path portions of the endless conveyor belt. At least one semi-circular end wall of the slits of the uttermost link portions is at an angle that corresponds to the curvature radius of the drums. The exterior sleeves are connected through bends to the connecting point of a link portion and an outer pulling arm. The longitudinal wall facing away from the exterior sleeve abuts the opposite exterior sleeve in an interior curve.

The link portions preferably comprise grooves at the bottom, extending in the direction of travel of the conveyor belt, which grooves have a depth of more than half the thickness of the link portions, and a lenght extending up to or near the edge of the link portions which faces away from the pulling arms. This is important with respect to maintaining the conveyor belt and keeping it clean.

If a driving and tensioning means comprises two wheels resembling chain wheels with a centre distance equal to or a multiple of the pitch of the pivoting pins of a tensioned conveyor belt in a straight path portion, said conveyor belt being guided about said two wheels in such a way that it passes a tensioning roll loaded by at least one spring, according to the invention at least one small roll is arranged between said two wheels, which small roll projects somewhat above the top surface of the conveyor belt so as to position those products that have gone off course again correctly perpendicularly to the direction of travel of the conveyor belt. These driven small rolls again make the machine easy to clean.

The invention will be elucidated hereinafter on the basis of the drawing, in which by means of an example an embodiment of a unit according to the invention is represented. In the drawing.

Figure 1:
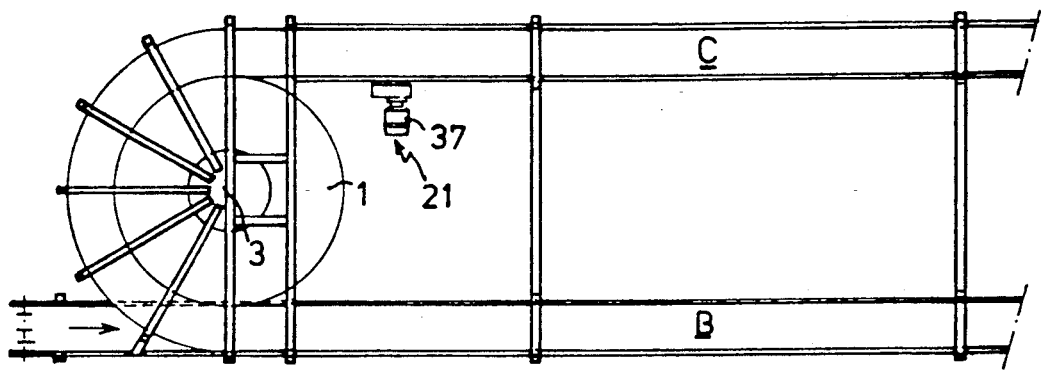
FIG. 1 shows a top view of the left portion of the treatment unit.
Figure 2:
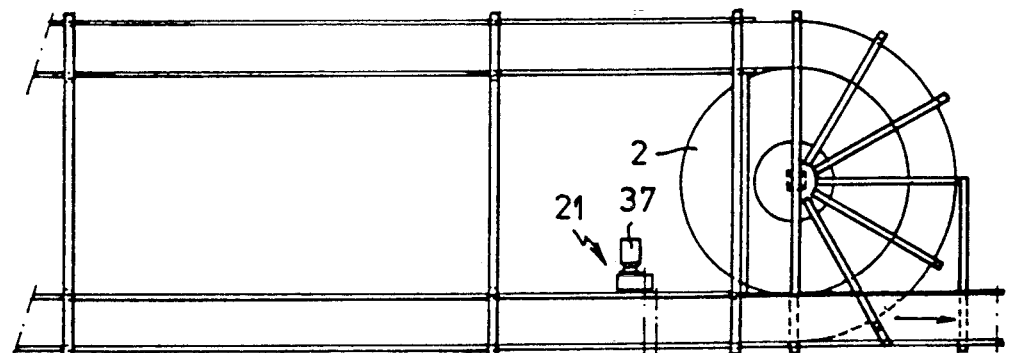
FIG. 2 shows a top view of the right portion of the treatment unit.
Figure 3:
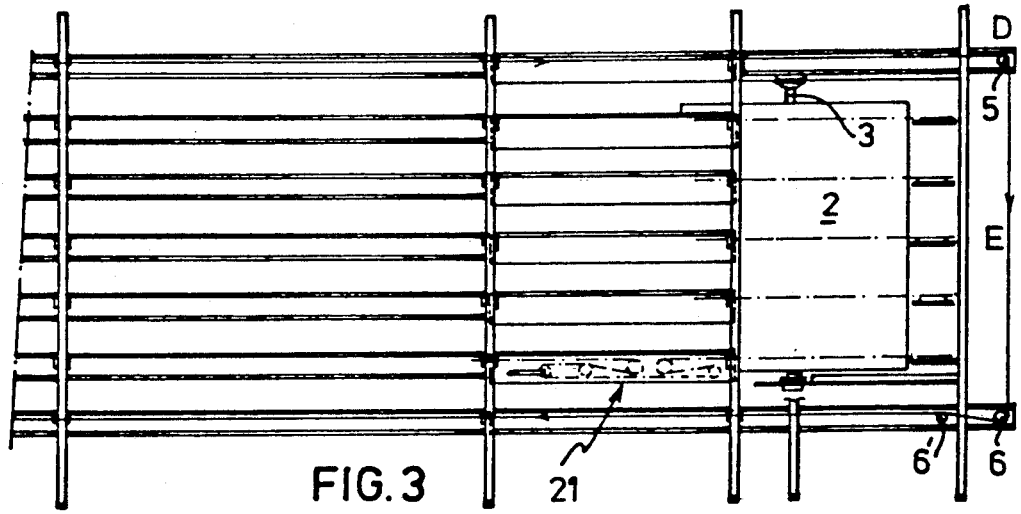
FIG. 3 shows a longitudinal view of FIG. 2.
Figure 4:
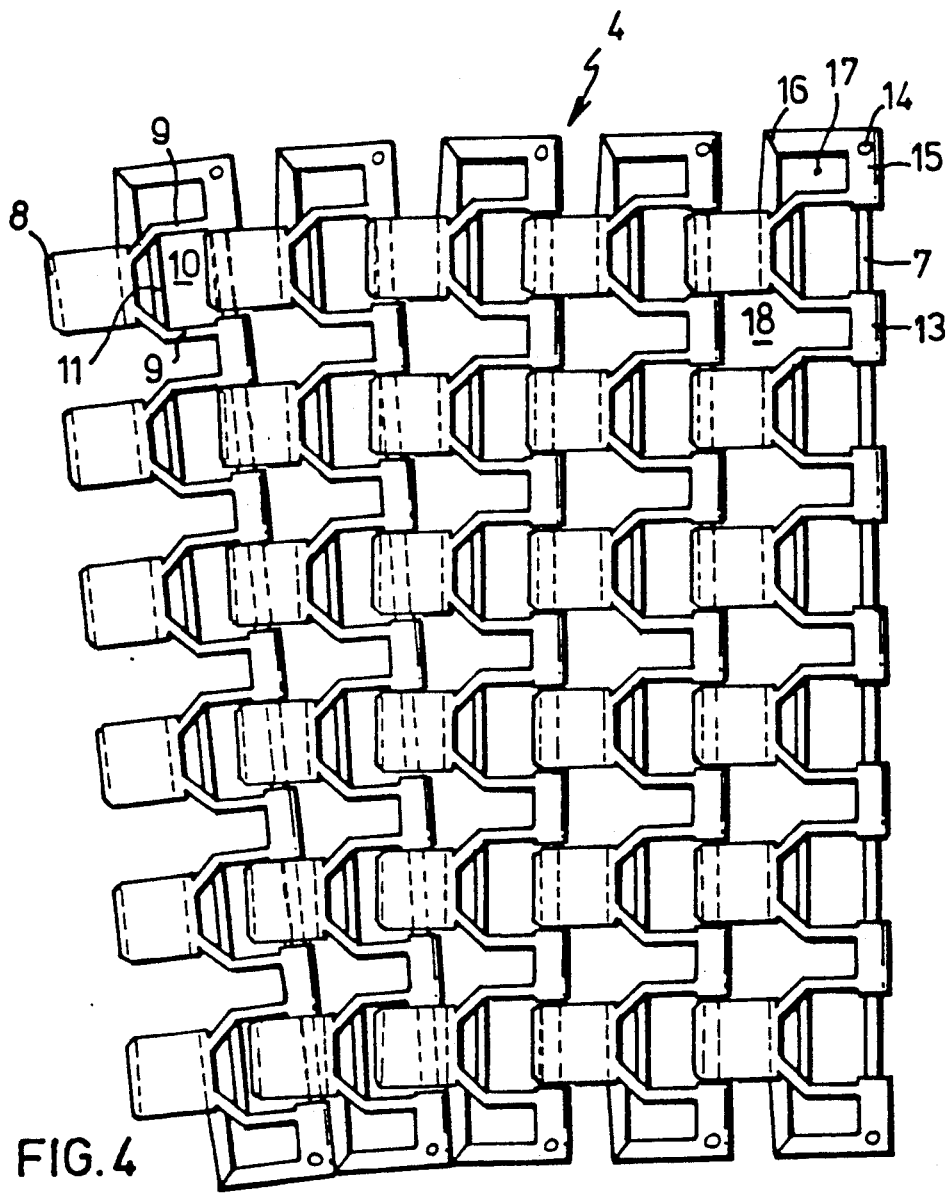
Figures 5, 6, 7:
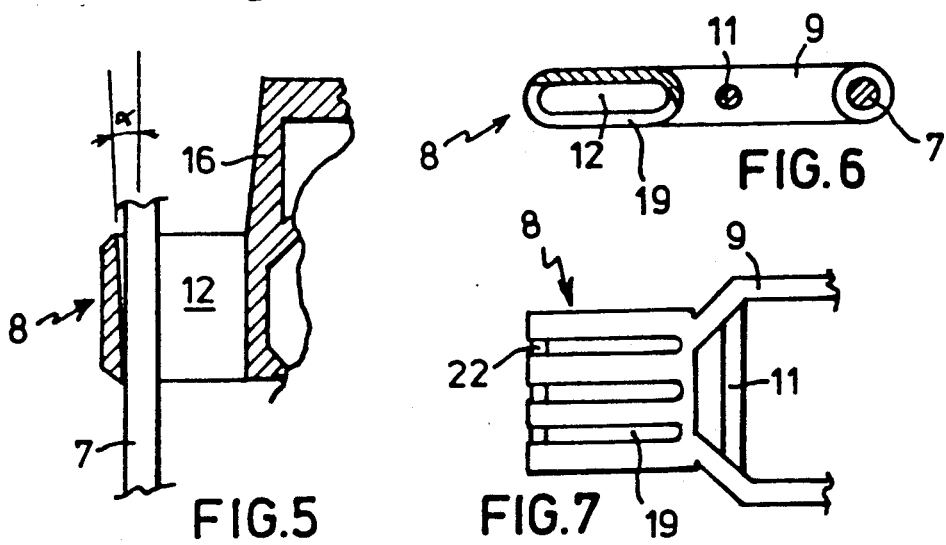
Figure 8:
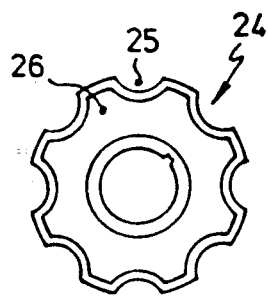
Figure 9:
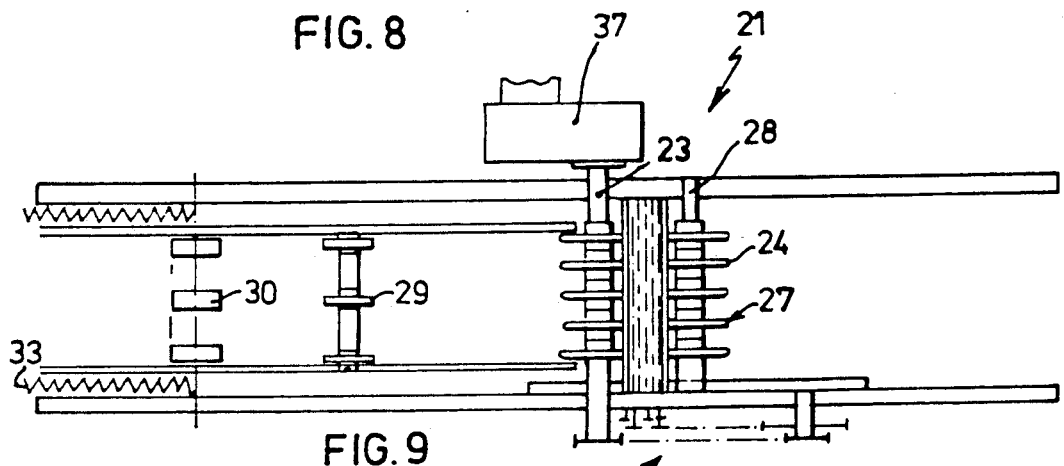
Figure 10:
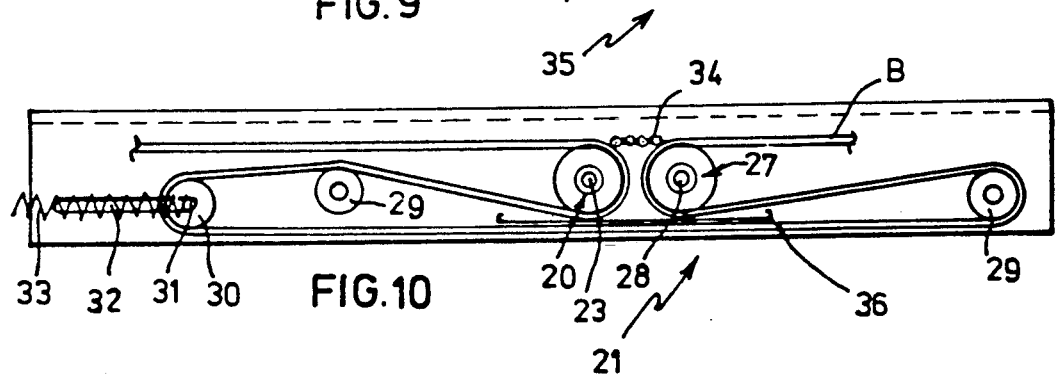

FIG. 4 shows, on a larger scale, a top view of a portion of a conveyor belt of the unit of the FIGS. 1-3, FIG. 5 shows, at about real size, a horizontal cross-section through an outer link portion, FIG. 6 shows, at about real size, a vertical cross-section through a link of the conveyor belt of FIG. 4, FIG. 7 shows a bottom view of FIG. 6, FIG. 8 shows a longitudinal view of a chain crown for a driving or turning wheel, FIG. 9 show, at a larger scale than in FIGS. 1-3, a schematic top view of a driving and tensioning means, and FIG. 10 shows a longitudinal view of FIG. 9.

The unit represented in FIGS. 1-3 has two freely rotatable drums 1 and 2 with a diameter of 1.6 m of which the vertical centre lines 3 are spaced apart at at least 40 m. A conveyor belt 4 (FIG. 4) with a length of approx. 600 m. extends through said unit.

The products are supplied to the unit at drum 1 in a low position A. The conveyor belt 4 and the products possibly positioned thereon are then conveyed, while steadily rising, through a lowermost path portion B at the front of the unit, subsequently around the drum 2, and then obliquely through a lowermost path portion C at the rear of the unit so as to arrive at the second floor or level. In this way, the following floors or levels are also passed, in order to finally arrive at the high discharge position D of drum 2. A roll 5 is mounted at position D so as to guide the conveyor belt 4 to a vertical path portion E. At a level below the lowermost path portion B, a subsequent roll 6 is disposed perpendicularly below the roll 5, for guiding the conveyor belt 4 to a path portion F which ends at position A and connects there by means of a roll (not shown) to the lowermost path portion B so as to make the conveyor belt 4 endless.

The manner in which the conveyor belt 4 is supported in the various path portions is not relevant to the invention. The unit may also comprise more than two drums or similar guidings and the path of the conveyor belt may also comprise S-shaped track portions. However, the manner in which the conveyor belt itself is devised is essential to the invention and therefore it will be elucidated on the basis of FIGS. 4-7.

FIG. 4 shows five links of a conveyor belt 4 comprising pivoting pins 7, in the position in which the central pivoting pin 7 intersects the vertical centre line 3 of the drum 1 in FIG. 1. The three links on the left of FIG. 4 are therefore arranged in a curve along the drum 1 and the two links on the right are so to speak incorporated in an obliquely rising path portion C.

In the represented embodiment, a link consists of six link portions 8 which each comprise two buckled pulling arms 9. Two pulling arms 9 of one link portion 8 define a recess 10 which is wide enough to receive a link portion of an adjacent link with clearance. Therefore the distance between said two pulling arms is slightly greater than the width of a link portion 8. For the sake of strength, the pulling arms 9 of one link portion 8 are connected by a rib 11, connecting the two buckling points of the pulling arms 9 of one link portion 8. Without this provision, the pulling arms might bend and eventually break. Said rib 11 is positioned so close to the link portion 8, that the link portions, comprising a slit 12 for receiving the pivoting pin 7, can sufficiently more back and forth in said recess.

As the semi-circular end walls of the slits 12 of the four interior link portions 8 are simply perpendicular to the side walls of the said link portions and therefore parallel to the centre lines of the pivoting pins 7 in the straight path portions, the pulling forces in the straight track portions of the conveyor belt are substantially transferred to the pivoting pins 7 by said four link portions 8. The semi-circular end walls of the slits 12 of at least one of the exterior link portions 8 are not perpendicular to the side walls, but they have centre lines which are at such an angle to the centre lines of the pivoting pins 7 that these centre lines intersect at a point which at given times substantially coincides with the vertical centre lines 3 of the drums 1 and 2. This is indicated in FIG. 5 by angle α. The consequence of this detail is that the pulling force is in the 180° curve portions of the conveyor belt about the drums 1 and 2 is substantially transferred to the uppermost link portion 8 and the pivoting pin 7, both in FIG. 7.

Two adjacent pulling arms 9 of the two neighbouring link portions 8 are connected by a sleeve 13 in which a pivoting pin 7 can be received. The ends of a pivoting pin 7 are fixed into bores of outer sleeves 15 by means of a screw or pin 14, which sleeves are connected via bends 16 to the connecting point of a link portion 8 and an outer pulling arm 9. These bends can either be massive or comprise a hole 17, as shown. This does not only save material, but it also provides a better (cooling) air circulation. The longitudinal wall facing away from the outer sleeve 15 of the bend 16 is positioned so, that it will face the oppositely disposed outer sleeve 15 in the inner curve (left bottom side of FIG. 4). In this way pressing forces are compensated, so that the conveyor belt cannot "break out".

Connecting two neighbouring link portions 8 by a sleeve 13 has the advantage that the length of the space 18 between the link portions 8, engaging drive wheels 20 driven by motors 37 and resembling chain wheels of a driving and tensioning means 21, can be chosen wider.

So as to be able to also use the conveyor belt in oppositely rotating units with e.g. S-curves, it is devised symmetrical, i.e. with semi-circular end walls in either outer link part 8 at an angle α and also having a bend 16 on either end.

Grooves 19 are made in the bottom of the link portions 8. It appears from FIGS. 6 and 7 that those grooves 19 have such dimensions that they are connected to a slit 12. Therefore they have a depth of more than half the thickness of the link portion 8 and such a length that the semi-circular side walls of the slits are interrupted, resulting in the set of three visible planes 22 represented in FIG. 7. Consequently, the pivoting pins 7 have to remove combinations of crumbs and fat particles deposited thereon only over a shorter path.

A further elucidation to the driving and tensioning means 21 will be given on the basis of FIGS. 8-10. Such a means 21 is merely represented in FIG. 3 in the lowermost path portion B, but it is standard procedure to also provide the superposed path portions B and also the path portions C of the unit with such a means.

Each driving and tensioning means 21 comprises a motor 37 that rotatably drives a shaft 23. Five chain crowns 24, together forming a drive wheel 20, are mounted on said shaft 23. According to FIG. 8 such a chain crown 24 comprises a set of eight cavities 25 of which the pitch corresponds to the centre distance of the pivoting pins 7 in a straight path of the conveyor belt, so that blunt teeth 26 disposed between the cavities 25 are able to engage in the spaces 18 of the conveyor belt 4 so as to drive it. A turning wheel 27 with the same exterior as the drive wheel 20 is freely rotatably mounted on a second shaft 28. Further guide means 29 are provided so as to have the conveyor belt 4 follow two horizontal loops, and a tensioning roll 30 which is borne on a shaft 31 which can be slid far into a slit 32 of the frame and which is tensioned by springs 33. The special characteristic of the tensioning and driving means 21 is that a number of small rolls 34 is disposed between the wheels 20 and 27 which project slightly above the path in order to position the products which have gone off course, such as loaves of bread, again correctly perpendicularly to the direction of travel of the conveyor belt 4. The most favourable position for treatment could be disrupted during the motion of the breads through curves about the vertical drums 1 and 2. The small rolls 34 have such a centre distance that they clean one another even if the smallest bit of dirt adheres to one of them, which is even enhanced by the fact that they are all driven in the same direction by transfer means 35 branched from the motor 37. The number of small rolls 34 has obviously also been chosen so, that the products to be treated cannot tilt. Crumbs and the like are collected in a tray 36 which can be emptied on a regular basis.

Within the framework of the claims other embodiments than merely the ones represented in the drawing are also possible, particularly units having more than two drums in which the path can include S-shaped track portions.

I claim:

1. A conveyor, comprising an endless conveyor belt provided with pivoting pins, for moving products along a path through a treatment unit, said unit substantially comprising at least two drums or similar guiding means rotatable about a vertical center line, along which said path follows a curve of a definite grade value in a slightly tilted plane, and support members for the remaining, also slightly tilted, track portions, the arrangement being so that the products to be treated can be supplied at the one drum in a low position and discharged at the other drum in a high position or vice versa, said conveyor belt returning from the high position to the low position via a vertical and a horizontal path portion, and driving and tensioning means for the conveyor belt, said conveyor belt comprising links consisting of a material that can be rolled or obtained by injection moulding of a synthetic material, each link comprising a number of flat link portions with recesses defined by pulling arms, said pivoting pins being tightly secured to the pulling arms and being able to move in the plane of the conveyor belt through slits of the link portions disposed in the recesses, and a driving means comprising at least one drive wheel resembling a sprocket wheel with teeth which are received in the space between two link portions, the adjacent pulling arms of two neighboring link portions being connected by a sleeve which can receive a pivoting pin, at least one end of each pivoting pin being secured in an exterior sleeve connected to an outer pulling arm, and at least one semi-circular end wall of the slits of the uttermost link portions being at an angle that corresponds to the curvature radius of the drums.

2. A conveyor, comprising an endless conveyor belt provided with pivoting pins, for moving products along a path through a treatment unit, said unit substantially comprising at least two drums or similar guiding means being rotatable about a vertical center line, along which said path follows a curve of a definite grade value in a slightly tilted plane, and support members for the remaining, also slightly tilted, tract portions, the arrangement being so that the products to be treated can be supplied at the one drum in a low position and discharged at the other drum in a high position or vice versa, said conveyor belt returning from the high position to the low position via a vertical and a horizontal path portion, and driving and tensioning means for the conveyor belt, said conveyor belt comprising links consisting of a material that can be rolled or obtained by injection moulding of a synthetic material, each link comprising a number of flat link portions with recesses defined by pulling arms, said pivoting being tightly secured to the pulling arms and being able to move in the plane of the conveyor belt through slits of the link portions disposed in the recesses, and a driving means comprising at least one drive wheel resembling a sprocket wheel with teeth which are received in the space between two link portions, the adjacent pulling arms of two neighboring link portions being connected by a sleeve which can receive a pivoting pin, at least one end of each pivoting pin being secured in an exterior sleeve connected to an outer pulling arm, at least one semi-circular end wall of the slits of the uttermost link portions being at an angle that corresponds to the curvature radius of the drums, and the exterior sleeves being connected through bends to the connecting point of a link portion and an outer pulling arm.

3. The conveyor according to claim 2 wherein a longitudinal wall facing away from the exterior sleeve abuts the opposite exterior sleeve in an interior curve.

4. A conveyor, comprising an endless conveyor belt provided with pivoting pins, for moving products along a path through a treatment unit, said unit substantially comprising at least two drums or similar guiding means being rotatable about a vertical center line, along which said path follows a curve of a definite grade value in a slightly tilted plane, and support members for the remaining, also slightly tilted, tract portions, the arrangement being so that the products to be treated can be supplied at the one drum in a low position and discharged at the other drum in a high position or vice versa, said conveyor belt returning from the high position to the low position via a vertical and a horizontal path portion, and driving and tensioning means for the conveyor belt, said conveyor belt comprising links consisting of a material that can be rolled or obtained by injection moulding of a synthetic material, each link comprising a number of flat link portions with recesses defined by pulling arms, said pivoting pins being tightly secured to the pulling arms and being able to move in the plane of the conveyor belt through slits of the link portions disposed in the recesses, and a driving means comprising at least one drive wheel resembling a sprocket wheel with teeth which are received in the space between two link portions, the adjacent pulling arms of two neighboring link portions being connected by a sleeve which can receive a pivoting pin, at least one end of each pivoting pin being secured in an exterior sleeve connected to an outer pulling arm, at least one semi-circular end wall of the slits of the uttermost link portions being at an angle that corresponds to the curvature radius to the drums, said exterior sleeves being connected through bends to the connecting point of a link portion and an outer pulling arm, a longitudinal wall facing away from the exterior sleeve abutting the opposite exterior sleeve in an interior curve, and said link portions comprising grooves at their bottoms, the bottom side of the grooves extending in the direction of travel of the conveyor belt, the link portions having a depth of more than half the thickness of the link portions, and a length extending up to or near the edge of the link portions which faces away from the pulling arms.

5. A conveyor, comprising an endless belt provided with pivoting pins, for moving products along a path through a treatment unit, said unit substantially comprising at least two drums or similar guiding means being rotatable about a vertical center line, along which said path follows a curve of a definite grade value in a slightly tilted plane, and support members for the remaining, also slightly tilted, track portions, the arrangement being so that the products to be treated can be supplied at the one drum in a low position and discharged at the other drum in a high position or vice versa, said conveyor belt returning from the high position to the low position via a vertical and a horizontal path portion, and driving and tensioning means for the conveyor belt, said conveyor belt comprising links consisting of a material that can be rolled or obtained by injection moulding of a synthetic material, each link comprising a number of flat link portions with recesses defined by pulling arms, said pivoting pins being tightly secured to the pulling arms and being able to move in the plane of the conveyor belt through slits of the link portions disposed in the recesses, and a driving means comprising at least one drive wheel resembling a sprocket wheel with teeth which are received in the space between two link portions, the adjacent pulling arms of two neighboring link portions being connected by a sleeve which can receive a pivoting pin, at least one end of each pivoting pin being secured in an exterior sleeve connected to an outer pulling arm, at least one semi-circular end wall of the slits of the uttermost link portions being at an angle that corresponds to the curvature radius of the drums, said driving and tensioning means comprising two wheels that resemble sprocket wheels and which have a center-to-center distance which is equal to or a multiple of the pitch of the pivoting pins of a tensioned conveyor belt in a straight path portion, said conveyor belt being guided around said two wheels, so as to pass at least one spring loaded tensioning roll, at least one small roll that projects slightly above the top surface of the conveyor belt being provided between the two wheels in order to position products precisely perpendicularly to the direction of travel of the conveyor belt again if they have gone off course.

6. Conveyor according to claim 5, wherein the wheels have at least two chain crowns.

7. Conveyor according to claim 5 or 6, wherein said driving and tensioning means comprise a motor, said motor having transfer means branched therefrom, said small rolls being driven in the same direction via the transfer means by the motor that drives the driving wheel.

* * * * *